US011393410B2

(12) United States Patent
Ju et al.

(10) Patent No.: US 11,393,410 B2
(45) Date of Patent: Jul. 19, 2022

(54) METHOD OF ACQUIRING OUTSIDE LUMINANCE USING CAMERA SENSOR AND ELECTRONIC DEVICE APPLYING THE METHOD

(71) Applicant: SAMSUNG ELECTRONICS CO., LTD., Suwon-si (KR)

(72) Inventors: Wanjae Ju, Suwon-si (KR); Nanyoung Park, Suwon-si (KR); Jungyong Yun, Suwon-si (KR); Heewoong Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 16/744,633

(22) Filed: Jan. 16, 2020

(65) Prior Publication Data

US 2020/0234659 A1 Jul. 23, 2020

(30) Foreign Application Priority Data

Jan. 17, 2019 (KR) .................. 10-2019-0006414
Nov. 18, 2019 (KR) .................. 10-2019-0147441

(51) Int. Cl.
G09G 3/34 (2006.01)
G01J 1/12 (2006.01)
H04M 1/22 (2006.01)

(52) U.S. Cl.
CPC ............ G09G 3/3406 (2013.01); G01J 1/124 (2013.01); H04M 1/22 (2013.01); *G09G 2320/0646* (2013.01); *G09G 2360/144* (2013.01)

(58) Field of Classification Search
CPC .................. G01J 1/124; G09G 3/3406; G09G 2320/0646; G09G 2360/144;
(Continued)

(56) References Cited

U.S. PATENT DOCUMENTS 9,741,099 B2  8/2017  Lim et al.
10,997,908 B2  5/2021  Jang et al.
(Continued)

FOREIGN PATENT DOCUMENTS

CN  109147719  1/2019
GN  107851422  3/2018
(Continued)

OTHER PUBLICATIONS

Chinese Office Action dated Dec. 23, 2020 in corresponding Chinese Application No. 202010046029.9 (with translation).
(Continued)

*Primary Examiner* — Abbas I Abdulselam
(74) *Attorney, Agent, or Firm* — Nixon & Vanderhye P.C.

(57) ABSTRACT

According to various embodiments, an electronic device includes a housing, a display viewable through a front surface of the housing and configured to display a screen, a camera sensor disposed in at least a portion of the front surface of the housing and configured to measure an external illuminance, a processor operationally connected to the display and the camera sensor; and a memory operationally connected to the processor. The memory may store instructions that, when executed, cause the processor to control the electronic device to: detect an turn-on event of the display, turn on the camera sensor to acquire the external illuminance using the camera sensor based on the display being turned on, acquire preview image information for a specified time through the camera sensor, turn off the camera sensor, acquire the external illuminance using an exposure time and a brightness value based on the acquired preview image information, and control a luminance of the display based on the external illuminance.

19 Claims, 13 Drawing Sheets

(58) Field of Classification Search
CPC .............. H04N 5/2353; H04N 5/2351; H04M 2250/12; H04M 1/22
See application file for complete search history.

(56) References Cited

U.S. PATENT DOCUMENTS

| | | | |
|---|---|---|---|
| 2008/0048932 A1* | 2/2008 | Yanagisawa | G02B 27/01 345/9 |
| 2008/0192235 A1* | 8/2008 | Komiya | G01J 3/0291 356/72 |
| 2011/0075889 A1 | 3/2011 | Huang | |
| 2013/0181960 A1* | 7/2013 | Kim | G09G 5/10 345/207 |
| 2013/0322753 A1 | 12/2013 | Lim et al. | |
| 2014/0320552 A1 | 10/2014 | Seo et al. | |
| 2016/0140906 A1* | 5/2016 | Choi | G09G 3/3406 345/207 |
| 2018/0061313 A1 | 3/2018 | Jang et al. | |
| 2018/0218710 A1 | 8/2018 | Park et al. | |
| 2018/0226048 A1 | 9/2018 | Jo et al. | |
| 2018/0348049 A1 | 12/2018 | Yoon et al. | |
| 2018/0376072 A1 | 12/2018 | Kwon et al. | |
| 2021/0248221 A1* | 8/2021 | Yang | G06F 21/32 |

FOREIGN PATENT DOCUMENTS

| | | |
|---|---|---|
| JP | 2005-286523 | 10/2005 |
| JP | 2006-197205 | 7/2006 |
| JP | 3882522 | 2/2007 |
| JP | 2014-175780 | 9/2014 |
| TW | 200930072 | 7/2009 |
| TW | I355191 | 12/2011 |

OTHER PUBLICATIONS

International Search Report and Written Opinion dated May 8, 2020 in counterpart International Patent Application No. PCT/KR2019/0000753.

Extended European Search Report and Written Opinion dated Jun. 20, 2020 in counterpart European Patent Application No. 20152245.5.

Chinese Office Action dated Jan. 25, 2022 for CN Application No. 202010046029.9.

* cited by examiner

METHOD OF ACQUIRING OUTSIDE LUMINANCE USING CAMERA SENSOR AND ELECTRONIC DEVICE APPLYING THE METHOD

CROSS-REFERENCE TO RELATED APPLICATION

This application is based on and claims priority under 35 U.S.C. § 119 to Korean Patent Application No. 10-2019-0006414, filed on Jan. 17, 2019 and Korean Patent Application No. 10-2019-0147441, filed on Nov. 18, 2019, in the Korean Intellectual Property Office, the disclosure of which is incorporated by reference herein its entirety.

BACKGROUND

1. Field

The disclosure relates to a method of measuring an illuminance using a camera sensor and a technology for implementing an electronic device to which the method is applied.

2. Description of Related Art

An electronic device may set a luminance of a screen displayed on a display to deal with external environment. For example, the electronic device may control the luminance of the screen by measuring an external illuminance. The electronic device may include an illuminance sensor that acquires a brightness value to measure the external illuminance. The illuminance sensor may be disposed in the front surface of the electronic device. The electronic device may acquire a brightness value of a space in front of the electronic device through the illuminance sensor. The electronic device may measure the external illuminance based on the obtained brightness value and control the luminance of the screen according to the external illuminance.

Recently, bezels, which are edge regions of the electronic device, are minimized and the display is disposed substantially over the entire front of the electronic device. In this case, it may not be easy to arrange a separate illuminance sensor on the front surface of the electronic device. The electronic device may measure an external illuminance using a camera sensor disposed in front surface of the electronic device without a separate illuminance sensor and control a luminance of a screen according to the measured external illuminance.

When the electronic device uses the camera sensor to measure the external illuminance, a large amount of current may flow in the camera sensor during an interval for measuring the external illuminance. In addition, when the camera sensor is continuously used to measure the external illuminance, the battery consumption of the electronic device may increase.

Also, when the illuminance sensor is disposed under the display screen, the external illuminance value obtained from the illuminance sensor is affected by the brightness of the screen. Especially, when the external illuminance value is below the specified illuminance value, the influence by the brightness of the screen increases, and it would be difficult to measure the external illuminance value exactly.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and to provide at least the advantages described below. Accordingly, an example aspect of the disclosure is to provide a method and apparatus applying the method to reduce the battery consumption of an electronic device when measuring the external illuminance and measure the external illuminance accurately when using the light illuminance sensor disposed under the display screen.

In accordance with an example aspect of the disclosure, an electronic device includes a housing, a display viewable via a front surface of the housing to display a screen, a camera sensor disposed in at least a portion of the front surface of the housing configured to measure an external illuminance, a processor operationally connected to the display and the camera sensor, and a memory operationally connected to the processor, wherein the memory stores instructions that, when executed, cause the processor to control the electronic device to: detect an turn-on event of the display, turn on the camera sensor to acquire the external illuminance using the camera sensor based on the display being turned on, acquire preview image information for a specified time through the camera sensor, turn off the camera sensor, acquire the external illuminance using an exposure time and a brightness value based on the acquired preview image information, and control a luminance of the display based on the external illuminance.

In accordance with another example aspect of the disclosure, a method of measuring an external illuminance using a camera sensor of an electronic device includes detecting an turn-on event of a display, turning on the camera sensor to acquire the external illuminance using the camera sensor based on the display being turned on, acquiring preview image information for a specified time through the camera sensor, turning off the camera sensor, acquiring the external illuminance using an exposure time and a brightness value based on the acquired preview image information, and controlling a luminance of the display based on the external illuminance.

In accordance with another example aspect of the disclosure, an electronic device includes a housing, a display viewable via a front surface of the housing to display a screen, a camera including a camera sensor disposed in an area of the front surface of the housing other than an area in which the display is disposed to measure an external illuminance of a space that the front surface of the housing faces, an illuminance sensor disposed under the display and configured to measure the external illuminance, a processor operationally connected to the display, the camera, and the illuminance sensor, and a memory operationally connected to the processor, wherein the memory stores instructions that, when executed, cause the processor to control the electronic device to: detect turn-on event of the display, turn on the illuminance sensor when the display is turned on, obtain the external illuminance through the illuminance sensor during specified period, determine whether the external illuminance sensor is below specified first illuminance value, turn-on the camera sensor based on the external illuminance sensor being below the first illuminance value, acquire an exposure time and a brightness value from preview image information acquired by the camera sensor, compensate the external illuminance using the exposure time and/or the brightness value, and control a luminance of the display based on the compensated external illuminance.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following detailed description, taken in conjunction with the accompanying drawings, in which.

In the description of the drawings, the same or similar reference numerals may be used for the same or similar components.

DETAILED DESCRIPTION

Hereinafter, various example embodiments of the disclosure may be described with reference to accompanying drawings. Accordingly, those of ordinary skill in the art will recognize that various modifications, equivalents, and/or alternatives on the various example embodiments described herein can be variously made without departing from the scope and spirit of the disclosure.

Figure 1:
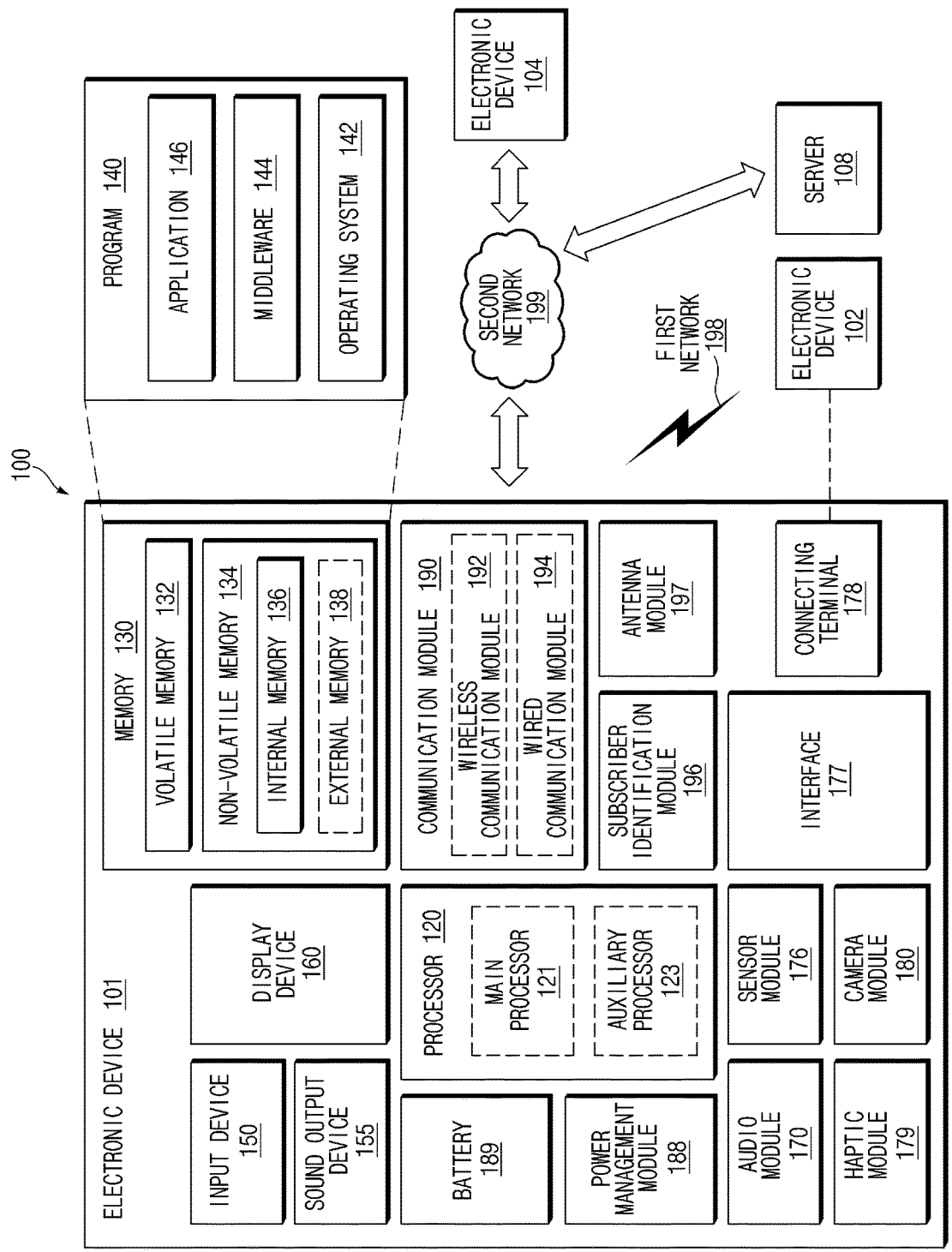
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
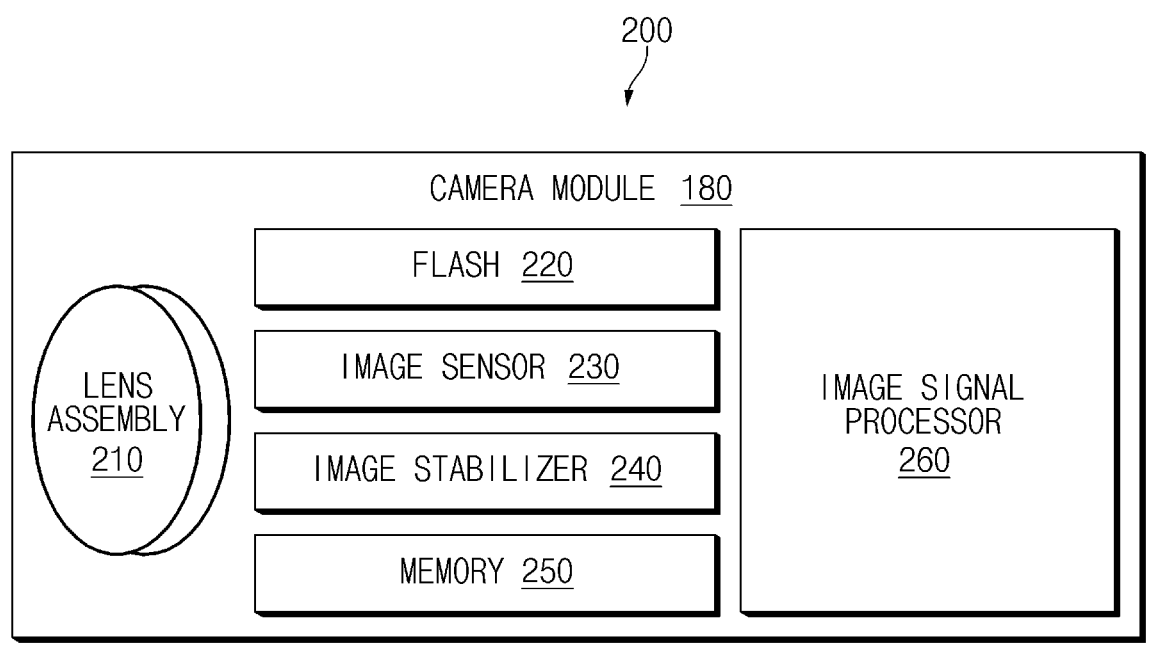
FIG. 2 is a block diagram illustrating an example camera module according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), and/or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally, or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
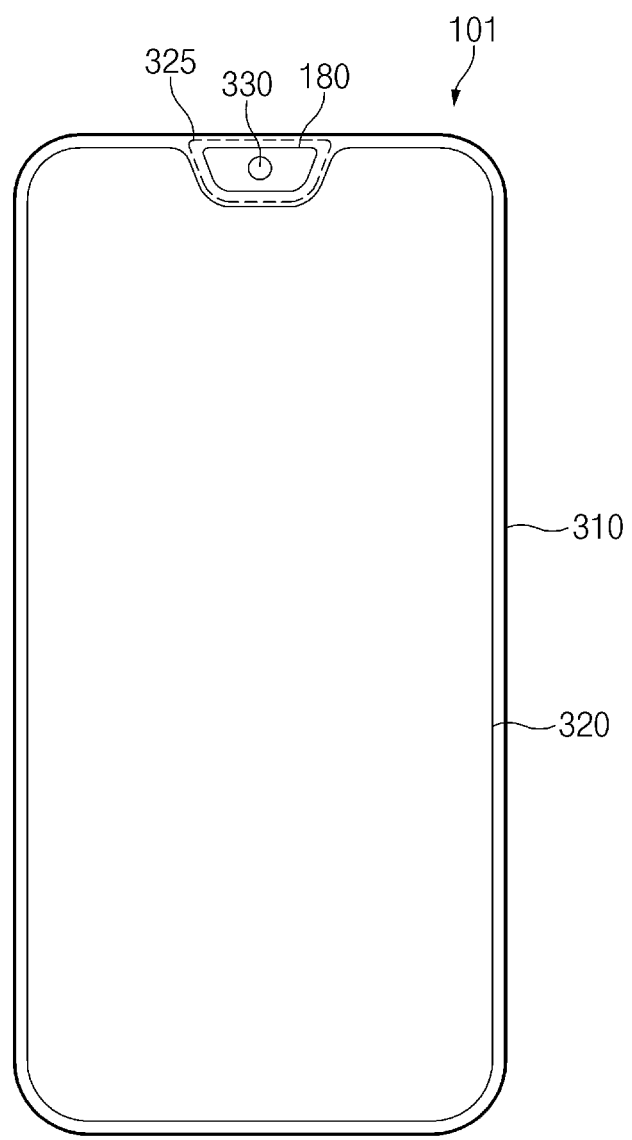
FIG. 3A is a diagram illustrating an example electronic device including a housing, a display, and a camera sensor according to an embodiment.
Figure 3B:
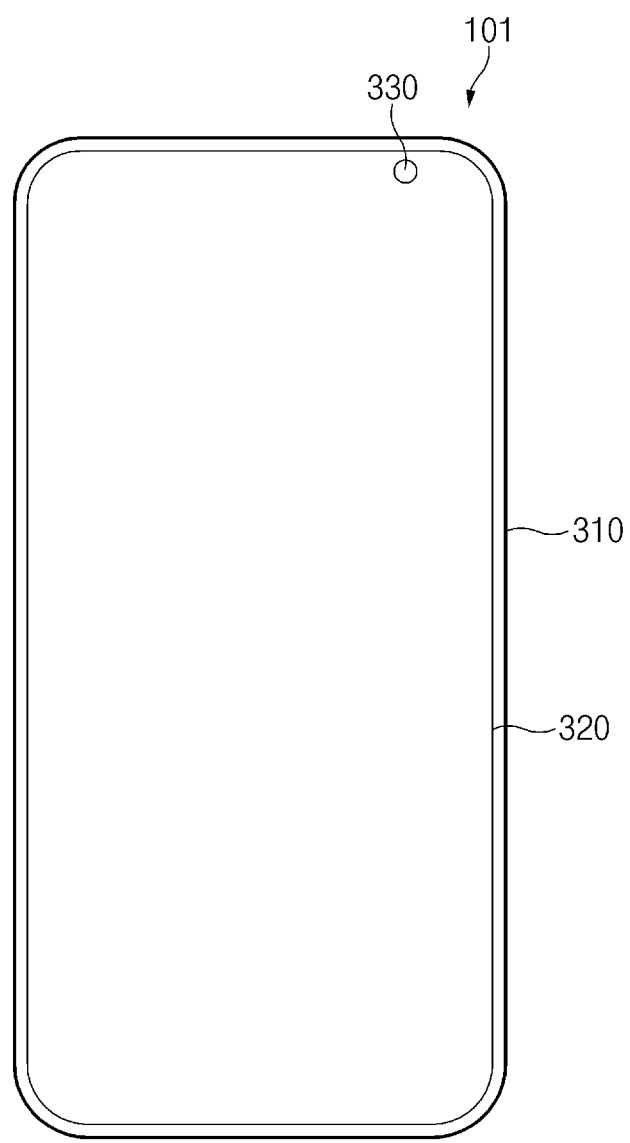
FIG. 3B is a diagram illustrating an example electronic device including a housing, a display, and a camera sensor according to another embodiment.

FIG. 3A is a diagram illustrating an example electronic device 101, including, for example, a housing 310, a display 320 (e.g., the display device 160 of FIG. 1), and a camera sensor 330 (e.g., the image sensor 230 of FIG. 2) according to an embodiment. FIG. 3B is a diagram illustrating the housing 310, the display 320, and the camera sensor 330 of the electronic device 101 according to another embodiment.

In an example embodiment, the housing 310 may define an outline or a contour of the electronic device 101. The housing 310 may include a first surface or front surface of the electronic device 101, a second surface or rear surface facing in the direction opposite to the first surface, and a side surface surrounding a space between the front surface and the rear surface. The first surface of the housing 310 may include a front plate which is at least partially substantially transparent. The front plate may include a substantially square rim or bezel that forms the first surface of the housing 310. For example, the front plate that forms the front surface of the housing 310 may be a glass plate or a polymer plate that includes various coating layers. The second surface of the housing 310 may be defined by the rear plate which may be substantially opaque. For example, the rear plate defining the rear surface of the housing 310 may include, for example, and without limitation, coated or colored glass, ceramic, polymer, metal (e.g., aluminum, stainless steel (STS), or magnesium), a combination of at least two thereof, or the like. The side surface of the housing 310 may be provided by a side bezel structure or side member coupled with the front plate and the rear plate and including metal and/or polymer. In some embodiments, the rear plate and side bezel structures of the housing 310 may be integrally formed and include the same material (e.g., a metal material such as aluminum).

In an example embodiment, the display 320 may be exposed to (e.g., viewable via) the front surface of the housing 310 to display a screen. The display 320 may be viewable through a substantial portion of the front plate. For example, at least a portion of the display 320 may be viewable through the front plate forming the first surface and a portion of the side surface. The display 320 may display a screen to the outside of the electronic device 101 to provide visual information to the user. For example, and without limitation, the display 320 may display a screen associated with information related to an operation state of an application (e.g., the application 146 of FIG. 1) performed by the electronic device 101, information acquired using a communication module (e.g., the communication module 190 of FIG. 1) by the electronic device 101 and/or information processed by the application 146 of the electronic device 101, etc.

In an example embodiment, as shown in FIG. 3A, at least some of the corners of the display 320 may be have a shape different from a quadrangle in the form of the front plate. A portion of the front plate disposed in the border region of the display 320 may have a thickness different from that of the remaining regions. For example, when a portion of the front plate disposed in the border region of the display 320 may be thicker than the remaining regions, the portion of the front plate forming the portion may be formed in the form of at least one notch 325. The notch 325 may be formed at an upper end of the terminal, such as the upper center, left side, or right side of the electronic device 101. For example, the camera module 180 including the camera sensor 330 may be disposed in the notch 325. As another example, the notch 325 may have a shape including only the camera sensor 330. In this case, at least a part of the camera module 180 may be hidden behind the display 320. In an example embodiment, as illustrated in FIG. 3A, the camera sensor 330 may be disposed in an area of the front surface of the housing 310 other than an area in which the display 320 is disposed. For example, the camera sensor 330 may be disposed in the notch of the front plate. In another embodiment, the camera sensor 330 may be disposed in at least a portion of the display 320 as shown, for example, in FIG. 3B. For example, at least one hole may be formed in the display 320 to enable the camera sensor 330 to receive light through the front. For example, the hole may be disposed at one edge of the display 320. The camera module 180 may be disposed on the rear surface of the display 320, and the camera sensor 330 may be viewed externally through the hole on the display 320.

In an example embodiment, a plurality of camera modules 180 and/or a plurality of camera sensors 330 may be provided. In this case, at least one camera sensor 330 included in at least one camera module 180 of the plurality of camera modules 180 and/or camera sensors 330 may be used for illuminance measurement.

In an example embodiment, the camera sensor 330 may measure external illuminance of a space that the front side of the housing 310 faces. For example, the external illuminance may be a value representing a brightness of an environment recognized in a direction in which the front plate faces.

In an example embodiment of the disclosure, the camera sensor 330 may detect external light incident at an angle falling within a specified angle range toward the electronic device 101 in the front direction of the housing 310 and measure an external illuminance. For example, the camera sensor 330 may acquire preview image information and measure the external illuminance. The preview image information may refer, for example, to information of a camera image acquired for the purpose of displaying the external environment recognized by the camera sensor 330 on the display 320. For example, the preview image information may refer, for example, to initial information of a preview image acquired by the camera sensor 330 and transferred to the processor 120 therein to be prepared for display on the display 320 before actually being displayed on a screen. The preview image displayed on the display 320 of the electronic device 101 may be generated and output based on accumulated preview image information. For example, the preview image information may be internal information of the electronic device 101 which the user is not able to actually recognize, and may be distinguished from the preview image output to the display 320. An image signal processor (e.g., the image signal processor 260 of FIG. 2) included in the camera module 180 may analyze the preview image information acquired by the camera sensor 330 and acquire parameters necessary for measuring an external illuminance.

Figure 4:
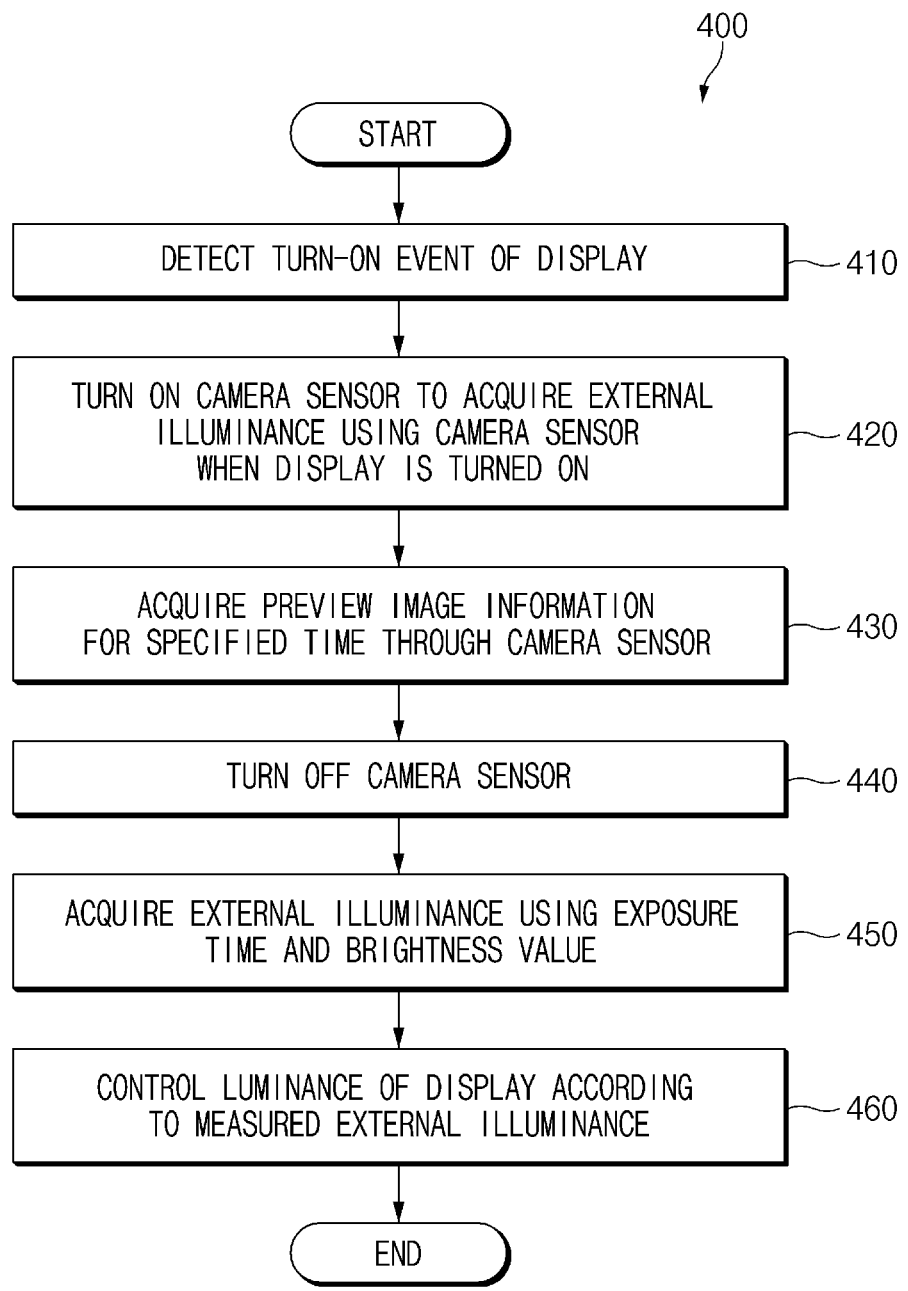
FIG. 4 is a flowchart illustrating an example method of acquiring an external illuminance using a camera sensor in an electronic device according to an embodiment.

FIG. 4 is a flowchart 400 illustrating an example method of acquiring an external illuminance using the camera sensor 330 in the electronic device 101 according to an embodiment.

According to an embodiment, the electronic device 101 or the processor (e.g., the processor 120 of FIG. 1 controlling the electronic device) may detect a turn-on event of a display (e.g., the display 320 of FIG. 3) in operation 410. Herein, where it is described in the disclosure that a processor performs a specified function, it will be understood that this description also includes the processor controlling the electronic device and/or components thereof to perform the function, and is not limited to the processor itself directly performing the specified function(s). The turn-on event of the display 320 may include, for example, and without limitation, a power-on, a key input during standby, an event reception through a communication module (e.g., the communication module 190 of FIG. 1), a periodic notification, or the like. For example, when the electronic device 101 is turned on, the display 320 may be turned on to display a booting screen of the electronic device 101. As another example, when a key input or a touch input is received by the electronic device 101 in a state in which the electronic device 101 is turned on but the display 320 is turned off (e.g., in a standby state), a wake-up in which the display 320 is turned on may be performed. The wake-up may be performed when the electronic device 101 receives an input from a user through the display 320 or an input device of the electronic device 101 (e.g., the input device 150 of FIG. 1), when information and/or an event is acquired from the outside through the communication module 190 of the electronic device 101, or when a proximity of the electronic device 101 to another object is changed or an angle the electronic device 101 to the ground is changed. As another example, the turn-on event of the display 320 may occur to notify schedules stored in the memory of the electronic device 101 (e.g., the memory 130 of FIG. 1) or schedules stored in an application (e.g., the application 146 of FIG. 1). It will be understood that the disclosure is not limited to the foregoing examples.

According to an embodiment, in operation 420, the processor 120 may turn on the camera sensor 330 to acquire an external illuminance using the camera sensor (e.g., the camera sensor 330 of FIG. 3) when the display 320 is turned on. In the case of using the camera sensor 330, when the camera sensor 330 is turned off or in a sleep (or inactive) state, it may be difficult to identify a brightness of surroundings and therefore, the camera sensor 330 may be configured to identify a brightness of the surroundings by turning on the camera sensor 330 when the display 320 is turned on.

In an example embodiment, it is possible to turn on the camera sensor 330 by turning on the camera module (e.g., the camera module 180 of FIG. 1). For example, an illuminance of the outside may be measured through the camera sensor 330 by turning on the camera module 180. As another example, the processor 120 may selectively turn on and/or turn off the camera sensor 330 alone.

In an example embodiment, in operation 430, the processor 120 may acquire preview image information for a specified time through the camera sensor 330. For example, the processor 120 may maintain the turned-on state of the camera sensor 330 for the specified time and acquire an exposure time and a brightness value in an acquisition interval after an enable interval. For example, the processor 120 may acquire the exposure time and the brightness value necessary for calculating the external illuminance for the specified time from the preview image information acquired using the camera sensor 330 to identify a change in the external illuminance. The camera sensor 330 may transmit the exposure time and the brightness value to the processor 120 without capturing and/or storing the preview image information.

According to an embodiment, the enable interval may, for example, be an interval for preparation to acquire the preview image information is performed after the camera sensor 330 is turned on.

In an example embodiment, the acquisition interval may, for example, be an interval for which the camera sensor 330 is able to acquire information related to the external illuminance from the image after the camera sensor 330 is turned on. The camera sensor 330 may acquire and analyze the exposure time and the brightness value through the preview image information for the time set as the acquisition interval.

In an example embodiment, the exposure time may be a time for which the camera sensor 330 is exposed to external light. The exposure time may be an exposure value (EV). The exposure time may be set, for example, by a shutter speed of the camera module 180. When the camera module 180 acquires the preview image information in a space with a low external illuminance, the exposure time may increase. When the camera module 180 acquires the preview image information in a space with a high external illuminance, the preview image information may be sufficiently acquired even with a short exposure time, thereby reducing the exposure time. The exposure time may be adjusted by the camera module 180. The resolving power of the camera module 180 may be better when the exposure time is used than that of a case using an aperture sensitivity of the camera module 180 or a sensitivity of the image sensor 230. The resolving power may, for example, be a numerical value indicating the ability to accurately distinguish external illumination.

In an example embodiment, the brightness value may be a value related to ambient brightness information acquired by an image sensor of the camera module 180 (e.g., the image sensor 230 of FIG. 2) and then calculated, for example, according to an internal algorithm. The brightness value may be a BV (brightness value).

In an example embodiment, the processor 120 may acquire the exposure time and/or the brightness value from the preview image information using the camera sensor 330 when the display 320 is turned on. When the display 320 is turned on, the processor 120 may measure an external illuminance and control a brightness of the display 320.

According to an embodiment, the processor 120 may turn off the camera sensor 330 in operation 440. The camera sensor 330 may be turned off after performing an operation necessary to acquire the external illuminance. For example, the processor 120 may turn on the camera sensor 330 at specified periods. When the camera sensor 330 repeatedly performs turn-on and turn-off operations at each specified period, power consumption of the camera sensor 330 may be reduced compared to a case in which the camera sensor 330 continuously maintains a turned-on state. According to an embodiment, the processor 120 may variably determine a specified period for turning on the camera sensor 330. For example, the processor 120 may adjust the specified period based on the acquired external illuminance, as described in greater detail below with reference to FIG. 6.

According to an embodiment, in operation 450, the processor 120 may acquire an external illuminance by processing an exposure time and a brightness value. The processor 120 may calculate the external illuminance by selectively using the exposure time and/or the brightness value according to a luminance of the preview image information.

According to another embodiment, the electronic device 101 may simultaneously perform operations 440 and 450 after operation 430. According to another embodiment, the electronic device 101 may turn off the camera sensor 330 and simultaneously process an exposure time and a brightness value to acquire an external illuminance.

According to an embodiment, the processor 120 may control a luminance of the display 320 according to the measured external illuminance in operation 460. The processor 120 may decrease the luminance of a screen to minimize and/or reduce the glare of a user due to the brightness of a screen of the display 320 in low illuminance environment. The processor 120 may increase a luminance of the screen such that the user may recognize contents displayed on the display 320 in high illuminance environment. For example, the processor 120 may change the luminance of the screen to be proportional to the measured external illuminance.

Figure 5A:
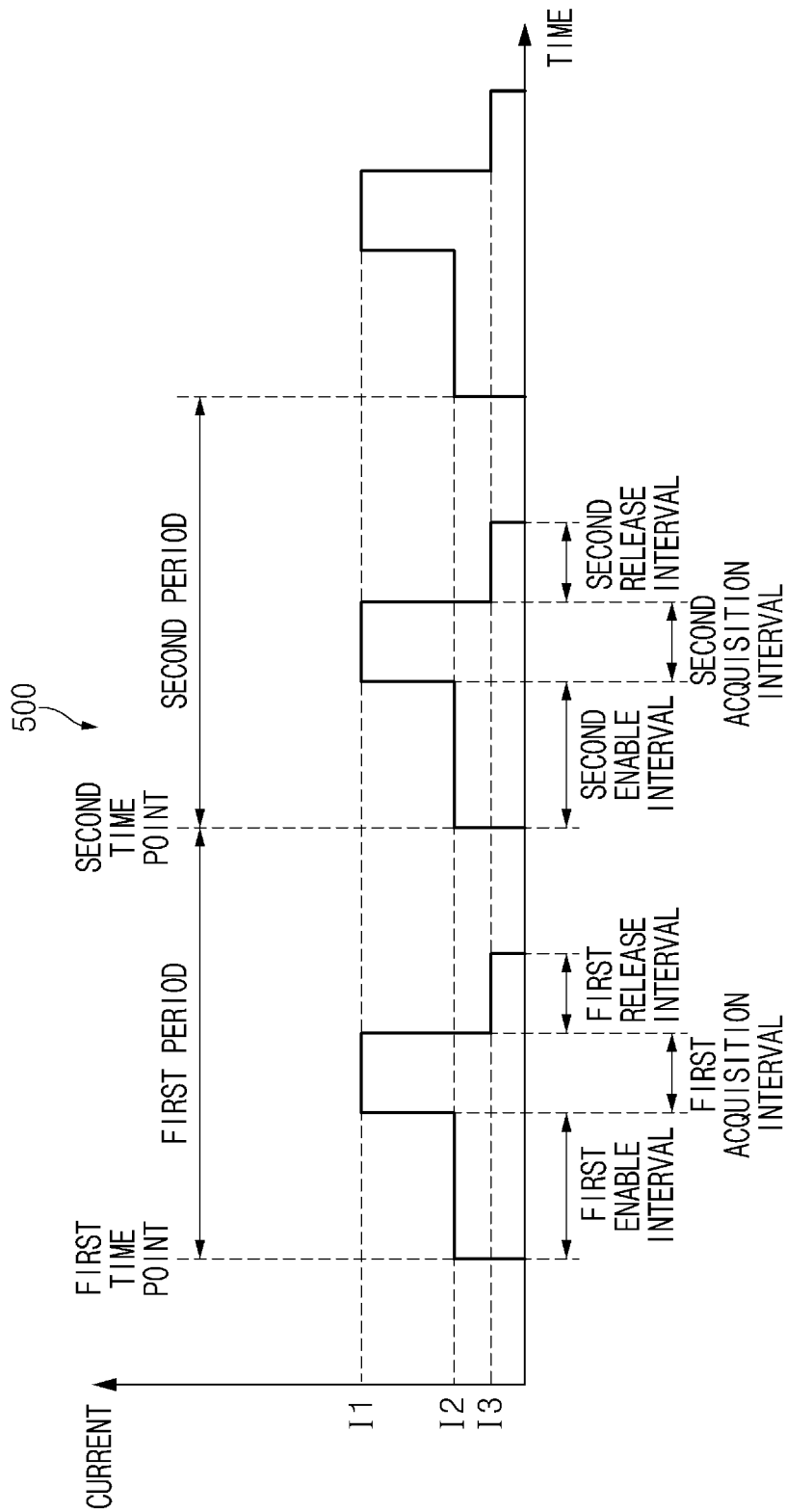
FIG. 5A is a graph illustrating a current with time, which is consumed by a camera module according to an embodiment.

FIG. 5A is a graph 500 illustrating a relationship of current with time, which is consumed by the camera module 180 according to an embodiment.

According to an embodiment, the electronic device 101 (e.g., the processor 120) may turn on the camera module 180 and/or the camera sensor 330 to measure the external illuminance through the camera sensor 330.

In an example embodiment, the processor 120 may turn on the camera sensor 330 at specified periods. The camera sensor 330 may be turned on at a first time point at which a first period starts and/or at a second time point at which a second period starts. The camera sensor 330 may be turned off in the middle of the first period and then turned on again at the second time point. For example, the first period and the second period may be substantially identical to each other. As another example, the first period and the second period may be different from each other according to the state of the electronic device 101 or the surrounding environment. As another example, the first period or the second period may be changed according to the state of the electronic device 101 or the surrounding environment.

In an example embodiment, a time interval in which the camera sensor 330 is turned on may correspond to an enable interval and/or an acquisition interval. The enable interval may be an interval in which the camera sensor 330 prepares to acquire preview image information after the camera sensor 330 is turned on. The acquisition interval may be an interval in which the camera sensor 330 acquires preview image information and acquires an exposure time and a brightness value from the preview image information.

In an example embodiment, the processor 120 may allow the camera module 180 to perform a release operation for switching the camera sensor 330 into a standby state for a predetermined interval after the camera sensor 330 is turned off. For example, a time interval in which the camera module 180 performs the release operation may be referred to as a release interval.

In an example embodiment, a first enable interval may start at a time point (e.g., a first time point) at which the first period starts, for example, a time point at which the camera sensor 330 is turned on, and a second enable interval may start at a time point (e.g., a second time point) at which the second period starts. The lengths of the first and second enable intervals may, for example, and without limitation, be about 0.25 seconds or more and about 0.3 seconds or less. However, the length of the interval may be set differently depending on the camera's electrical specifications, design, or operation method and is not limited to the examples set forth above.

According to an embodiment, a first acquisition interval may begin when the first enable interval ends in the first period, and a second acquisition interval may begin when the second enable interval ends in the second period. The length of the first and second acquisition intervals may be about 0.03 seconds or more and about 0.04 seconds or less.

In an example embodiment, the length of the acquisition interval may be substantially equal to any one frame included in a specified time. When the preview image information is recognized during at least one frame interval among a plurality of frames included in the specified time, an exposure time and a brightness value for a specified time may be acquired. In order to reduce power consumed by the camera module, the acquisition of the exposure time and brightness value using the camera sensor may be performed for substantially the same time as one frame interval (e.g., about 1/30 seconds when there are 30 frames per second). The processor 120 may set a turn-on period of the camera sensor 330 according to a situation or according to the capability supported by the camera sensor 330. For example, when the camera sensor 330 is able to acquire 60 frames of image information per second, the processor 120 may set the period to 1/60 seconds. For another example, when the camera sensor 330 is able to acquire N frames of image information per second, the processor 120 may set the period to 1/N seconds. This may be to allow the camera sensor 330 to repeatedly perform the periodic operation by minimizing the power for acquiring the preview image information once.

In an example embodiment, a first current I1 may be supplied to the camera sensor 330 in the acquisition interval. For example, the first current I1 may be a current used by the camera module 180 and/or the camera sensor 330 to perform an operation for acquiring preview image information and acquiring the exposure time and the brightness value from the preview image information. In the enable interval, a second current I2 lower than the first current I1 may flow. The second current I2 may be a current used by the camera sensor 330 to be turned on to perform preparation for acquiring the preview image information. The flow of current may refer, for example, to current being consumed in the camera module 180 and/or the camera sensor 330. The current consumption in the camera module 180 and/or the camera sensor 330 may refer, for example, to the camera module 180 and/or the camera sensor 330 consuming power.

In an example embodiment, when the camera sensor 330 periodically operates to acquire the exposure time and the brightness value, it may be important to perform control to keep power for a single operation to a minimum. The processor 120 may process the exposure time and/or the brightness value in real time to prevent and/or reduce a likelihood of the camera module 180 capturing a preview image or storing a preview image in the memory 130 to consume power separately.

In an example embodiment, the image signal processor 260 may transmit the exposure time and the brightness value to the application 146 in real time when acquiring the exposure time and the brightness value from one frame through a separate interface called the callback internally designed for the purpose of image quality improvement. The image signal processor 260 may not need to separately capture and/or store the preview image information. The processor 120 may receive and use the exposure time and the brightness value transmitted to the application 146 that processes the preview image information. When the processor 120 acquires the exposure time and the brightness value of the preview image information directly from the application 146, the current consumed by the camera module 180 may be saved. According to an embodiment, the image signal processor 260 may transmit the exposure time and the brightness value to the processor 120.

In an example embodiment, the camera sensor 330 may be turned off after the acquisition interval ends. A third current I3 may flow in the camera sensor 330 and/or the camera module 180 during the release interval.

Figure 5B:
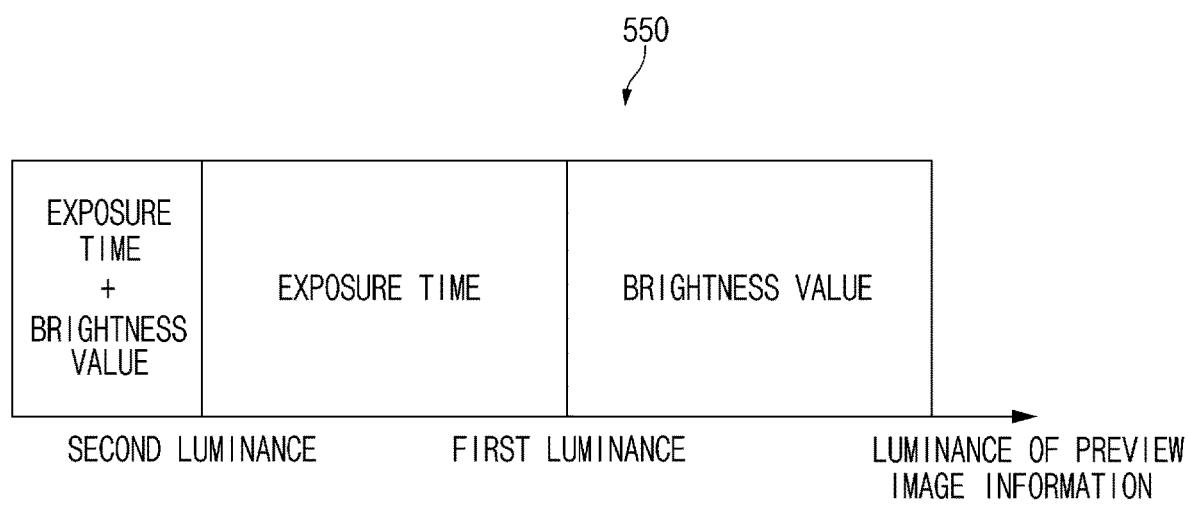
FIG. 5B is a graph illustrating an example parameter used to measure an external illuminance according to a luminance of preview image information according to an embodiment.

FIG. 5B is a graph 550 illustrating an example parameter used to measure an external illuminance according to luminance of preview image information according to an embodiment.

In an example embodiment, the processor 120 may, for example, and without limitation, measure an external illuminance using an exposure time when the luminance of the preview image information is less than or equal to a first luminance, measure the external illuminance using the brightness value when the luminance of the preview image information exceeds a first luminance, and measure the external illuminance using the exposure time and then using the brightness value when the luminance of the preview image information is less than or equal to a second luminance lower than the first luminance.

In an example embodiment, the first luminance may be a luminance that distinguishes a luminance of the preview image information in indoor environment and a luminance of the preview image information in outdoor environment. The processor 120 may determine that the camera sensor 330 is affected by illumination when the luminance of the preview image information is lower than the first luminance, and determine that the camera sensor 330 is affected by sunlight when the luminance of the preview image information is higher than the first luminance. For example, the first luminance may be about 3000 lux.

In an example embodiment, the second luminance may be a luminance that distinguishes general environment in which a light source exists and a low-illuminance environment in which a light source does not exist, such as a dark room or night environment. The processor 120 may determine that the camera sensor 330 is in the general environment when the luminance of the preview image information is higher than the second luminance, and determine that the camera sensor 330 is in the low-illuminance environment when the luminance of the preview image information is lower than the second luminance. For example, the second luminance may be about 15 lux, but is not limited thereto.

Figure 6:
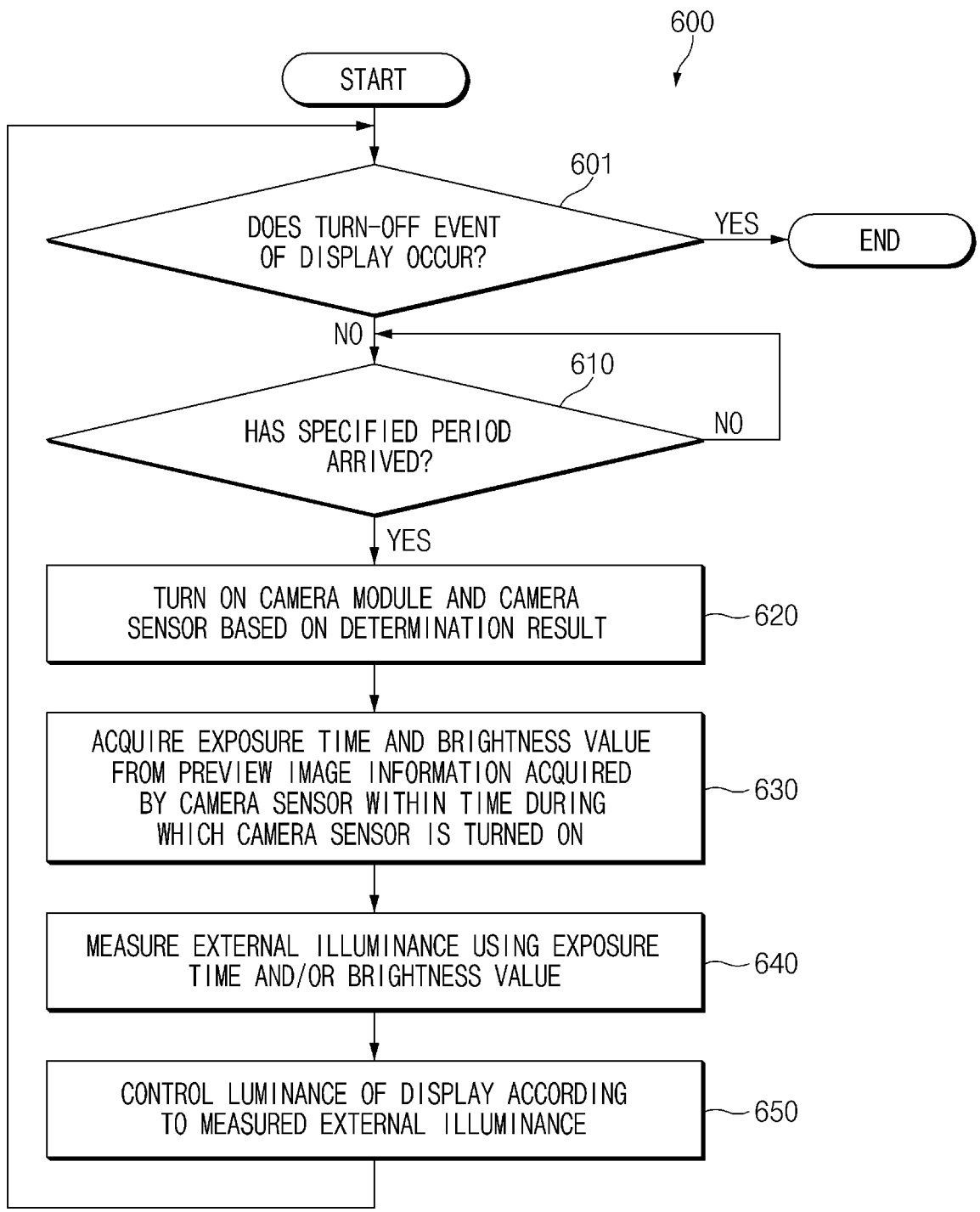
FIG. 6 is a flowchart illustrating an example method of periodically measuring an external illuminance using a camera sensor and controlling a luminance of a screen in an electronic device according to an embodiment.

FIG. 6 is a flowchart 600 illustrating an example method of periodically measuring an illuminance using the camera sensor 330 in the electronic device 101 according to an embodiment.

According to an embodiment, in operation 601, the electronic device 101 or the processor (e.g., the processor 120 of FIG. 1) may determine whether an event in which a display (e.g., the display 320 of FIG. 3) is turned off occurs. A luminance of a screen may need to be controlled only when the display 320 is turned on. Therefore, measuring an external illuminance using a camera sensor (e.g., the camera sensor 330 of FIG. 3) may be meaningful only when the display 320 is turned on. The processor 120 may terminate an operation of measuring an illuminance when an event in which the display 320 is turned off occurs ("Yes" in operation 601). The processor 120 may proceed to operation 610 when the display 320 is turned on because there is no event in which the display 320 is turned off. According to an embodiment, as described with reference to operation 410 of FIG. 4, the processor 120 may perform operation 601 after the turn-on of the display 320 is detected. For example, the processor 120 may perform operation 601 of FIG. 6 in a state in which the display 320 is turned on. For example, operation 420 of FIG. 4 may include operation 601, operation 610, and operation 620 of FIG. 6. For example, the processor 120 may perform operations 601, 610, and 620 to adjust a luminance of the display 320.

The processor 120 according to an embodiment may determine whether a specified period has arrived in operation 610. The specified period may, for example, be a period during which the camera sensor 330 needs to acquire preview image information to measure an external illuminance and apply the measured external illuminance to luminance control of the display 320. For example, when the luminance control of the display 320 takes about 3 seconds to 5 seconds after the measurement of the external illuminance in a stationary indoor environment, the specified period may be set to about 4 seconds. As another example, when the luminance control of the display 320 takes about 1 second to 2 seconds after the measurement of the external illuminance in a moving situation or outdoor environment, the specified period may be set to about 1.5 seconds. However, it will be understood that the foregoing time periods are merely examples, and that the disclosure is not limited thereto.

In an example embodiment, when the camera module 180 is kept in a turned-on state, an operating current for operating the camera module 180 may increase. Accordingly, the consumption of a battery (e.g., the battery 189 of FIG. 1) may increase. When the camera module 180 is not used, when the camera module 180 is turned off and temporarily turned on at each specified period, the operating current may decrease because the camera module 180 does not operate continuously.

In an example embodiment, the processor 120 may change a specified period so as for the camera sensor 330 to acquire an exposure time and a brightness value (e.g., the turn-on period of the camera sensor 330) according to an external environment. When the processor 120 turns on the camera sensor 330 and increases the specified period for measuring the external illuminance, power consumption of the camera sensor 330 may be reduced. When the processor 120 turns on the camera sensor 330 and shortens the specified period for measuring the external illuminance, the camera sensor 330 may quickly detect a change in the external illuminance.

In an example embodiment, the processor 120 may change the specified period according to a surrounding environment. The processor 120 may detect surrounding environment of the electronic device 101 using the communication module 190. For example, the processor 120 may determine whether the surrounding environment is an indoor environment or an outdoor environment using a reception state of a global positioning system (GPS). According to an embodiment, when it is determined that the surrounding environment is an indoor environment, the processor 120 may turn on the camera sensor 330 and increase a specified period for measuring an external illuminance to reduce power consumption of the camera sensor 330. According to an embodiment, when it is determined that the surrounding environment is an outdoor environment, the processor 120 may turn on the camera sensor 330 and decrease a specified period for measuring the external illuminance to enable the camera sensor 330 to quickly detect a change in the external illuminance. According to another embodiment, the processor 120 may reversely set indoor and/or outdoor operating periods. For example, after the outdoor environment is determined and the luminance of the display is adjusted brightly, even when moving to a room with a bright screen, it is determined that the possibility of inconvenience to the user due to the bright screen is not high and the operation period may be maintained.

In an example embodiment, the processor 120 may change the designated period according to the time information. The processor 120 may receive and/or be provided with time information indicating a time at a location where the electronic device 101 is currently located using the communication module 190. For example, the processor 120 may receive the standard time information (Coordinated Universal Time (UTC) or Greenwich Mean Time (GMT)) using the communication module 190, receive a current position through GPS and determine whether a time point at which the electronic device 101 is operating is daytime or nighttime. When the time point at the current position according to the time information is daytime, the processor 120 may decrease the specified period to enable the camera sensor 330 to quickly detect a change in the external illuminance. The processor 120 may reduce the power consumption of the camera sensor 330 by increasing the specified period when the time point at the current location according to the time information is nighttime.

In an example embodiment, the processor 120 may change a specified period according to whether the electronic device 101 moves and/or rotates. The processor 120 may detect whether the electronic device moves and/or rotates using an acceleration sensor and/or a gyro sensor included in a sensor module (e.g., the sensor module 176 of FIG. 1). The processor 120 may receive information related to the movement and/or rotation of the electronic device 101. According to an embodiment of the disclosure, when the electronic device 101 moves and/or rotates, the processor 120 may decrease the specified period to enable the camera sensor 330 to quickly detect a change in an external illuminance. According to an embodiment, when the electronic device 101 maintains a fixed state at a predetermined position, the processor 120 may increase the designated period to reduce power consumption of the camera sensor 330.

In an example embodiment, when the measured external illuminance remains substantially the same a predetermined number of times or more and a position of the electronic device 101 is fixed, the processor 120 may turn on the camera sensor 330 and increase a specified period for measuring the external illuminance. When the external illuminance measured by the camera sensor 330 at the specified period is kept substantially the same a predetermined number of times or more, and the position of the electronic device 101 is fixed, the processor 120 may determine that the external illuminance remains substantially the same. When the processor 120 determines that the external illuminance remains substantially the same, the processor 120 may turn on the camera sensor 330 and increase the specified period for measuring the external illuminance to reduce the power consumption of the camera sensor 330.

Referring back to FIG. 6, according to an embodiment, in operation 620, the processor 120 may turn on the camera module 180 and turn on the camera sensor 330 based on a result of the determination. For example, the processor 120 may turn on the camera module 180 and measure an external illuminance through the camera sensor 330. In another example, the processor 120 may turn on only the camera sensor 330.

In operation 630, the processor 120 may acquire an exposure time and a brightness value from preview image information acquired using the camera sensor 330 while the camera sensor 330 is turned on. The acquisition interval may be an interval in which the camera sensor 330 may acquire information related to external illumination from the image after the camera sensor 330 is turned on. In an example embodiment, an image signal processor (e.g., the image signal processor 260 of FIG. 2) of the camera module 180 may acquire the exposure time and the brightness value from the preview image information. According to an embodiment, the image signal processor 260 may transmit the exposure time and brightness value to an application (e.g., the application 146 of FIG. 1) through an interface. According to another embodiment, the image signal processor 260 may transmit the exposure time and brightness value to the processor (e.g., the processor 120 of FIG. 1).

According to an embodiment, the processor 120 may measure an external illuminance using the exposure time and/or the brightness value in operation 640. The exposure time may be advantageous to acquire a uniform illuminance value regardless of location of a light source in indoor lighting environment or low-illuminance environment. The brightness value may be advantageous to resolve an illuminance value of a bright image. It may be advantageous to resolve the illuminance value by processing the brightness value and the exposure time value together according to a situation, and optimal resolving power may be achieved in the case of considering both the actual exposure time value and the brightness value in the low-illuminance environment.

In an example embodiment, the processor 120 may acquire an illuminance value of a preview image using the exposure time in indoor environment in which the preview image has a general illuminance. The processor 120 may improve the resolving power in bright environment using the brightness value in outdoor environment in which the preview image has a high illuminance. The processor 120 may identify the exposure time and further identify the brightness value to further secure the resolving power of brightness in night environment in which the preview image has a low illuminance.

According to an embodiment, the processor 120 may control a luminance of the display 320 according to a measured external illuminance in operation 650. The processor 120 may decrease the luminance of the display 320 to minimize and/or reduce the glare of a user due to the brightness of the screen of the display 320 in low-illuminance environment. The processor 120 may increase the luminance of the display 320 such that the user may recognize contents displayed on the display 320 in high-illuminance environment. For example, the processor 120 may change the luminance of the display 320 to be proportional to the measured external illuminance.

Figure 7:
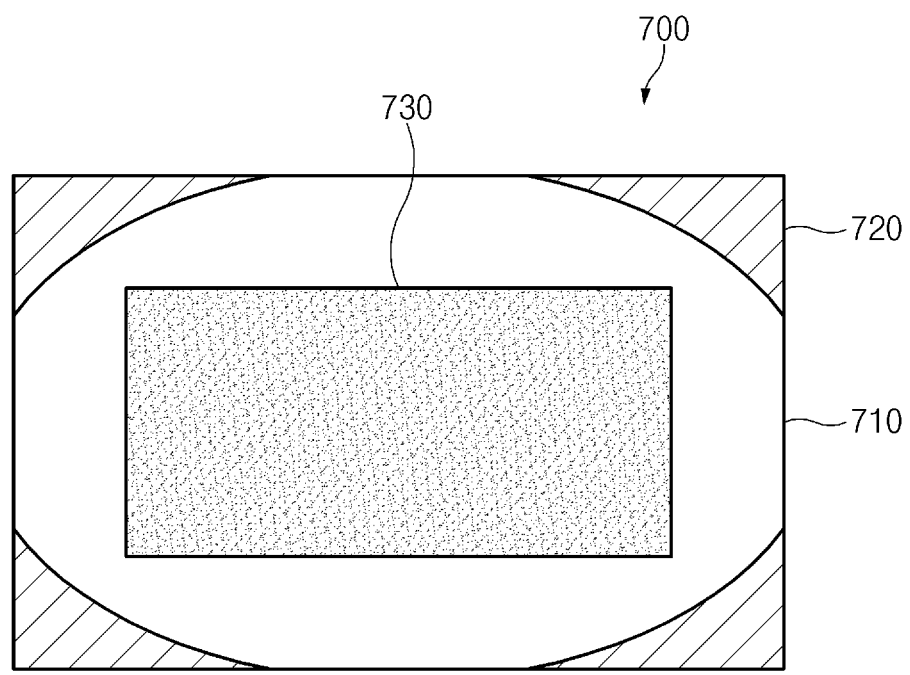
FIG. 7 is a diagram illustrating an example method by which an electronic device applies different gain values to edge regions and a center region of preview image information acquired using a camera sensor according to an embodiment.
Figure 8:
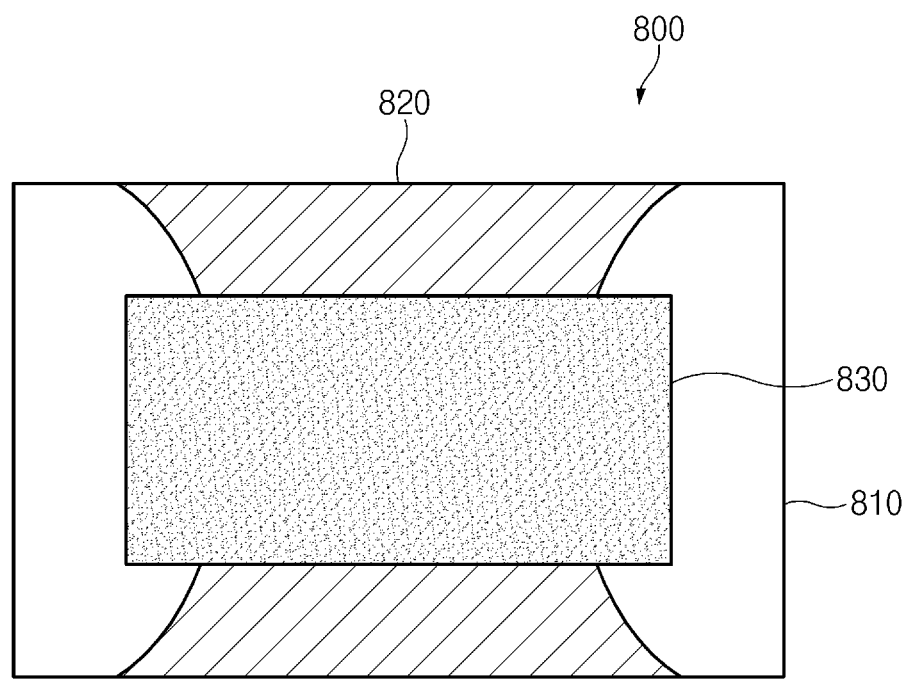
FIG. 8 is a diagram illustrating an example method by which an electronic device applies different gain values to edge regions and a center region of preview image information acquired using a camera sensor according to an embodiment.

FIGS. 7 and 8 are diagrams 700 and 800 illustrating example methods in which the electronic device 101 applies different gain values to edge regions and center regions 730 and 830 of preview image information acquired using the camera sensor 330 according to various embodiments.

According to an embodiment, the preview image information acquired by the camera sensor 330 may have first regions 710 and 810 which may, for example, be regions having a high external illuminance and second regions 720 and 820 which may, for example, be regions having a low external illuminance. For example, when the first region 710 includes the whole center region 730 in preview image information as illustrated in FIG. 7, the electronic device 101 (e.g., the processor 120) may determine that the preview image information has an external illuminance higher than an actual external illuminance. In another example, when the second region 820 occupies most of the center region 830 in the preview image information, as shown in FIG. 8, the electronic device 101 (e.g., the processor 120) may determine that the preview image information has a low external illuminance lower than the actual external illuminance. Even when the average external illuminance of the preview image information 700 of FIG. 7 and the average external illuminance of the preview image information 800 of FIG. 8 are substantially equal to each other, the electronic device 101 (e.g., the processor 120) may be determine that an average external illuminance of the preview image information 700 is higher than the average external illuminance of the preview image information 800 of FIG. 8.

In an example embodiment, the processor 120 may apply a first gain value to an exposure time and a brightness value acquired in the edge region of the preview image information acquired by the camera sensor 330, and apply a second gain value to an exposure time and a brightness value acquired in the center region 730 or 830 of the preview image information. As the second gain value, a value smaller than the first gain value may be applied. For example, it is possible to reduce the influence of the exposure time and the brightness value acquired in the central region 730 or 830 of the preview image information by applying a filter to the center region 730 or 830 of the preview image information when an external illuminance is calculated, The processor 120 may prevent and/or avoid the camera sensor 330 from distorting and calculating the average external illuminance by giving a weight to the center region 730 or 830.

In an embodiment, when a small gain value is applied to the exposure time and the brightness value acquired in the center region 730 or 830, the processor 120 may reduce variations according to positions of a light source using an algorithm for calculating an external illuminance using the exposure time and brightness value acquired from the preview image information. To reduce variations according to the positions of the light sources, the processor 120 may decrease application ratios of an exposure time and a brightness value in the center region 730 or 830 of the preview image information acquired by the camera sensor 330 and use an exposure time and a brightness value in the edge region of the preview image information acquired by the camera sensor 330.

Figure 9:
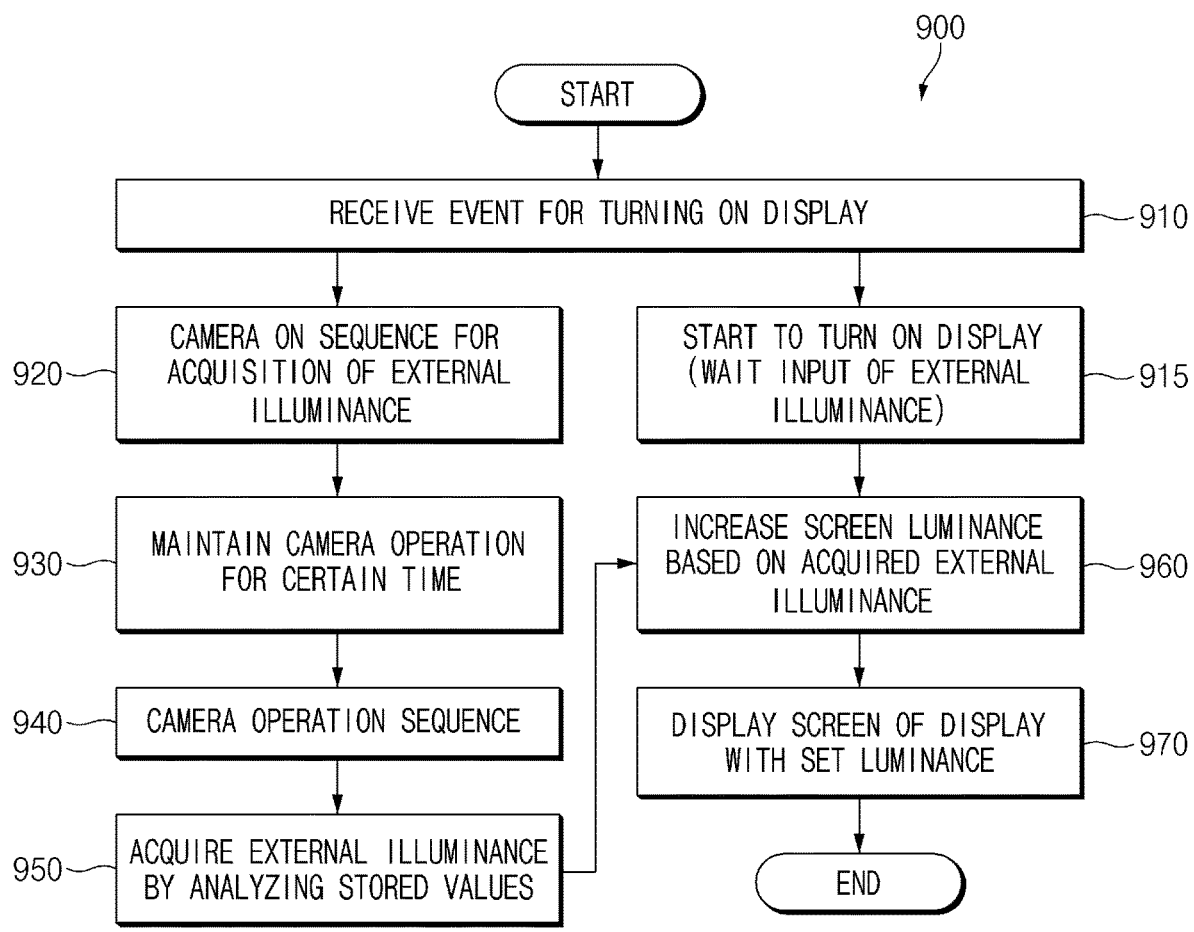
FIG. 9 is a flowchart illustrating an example method of acquiring an external illuminance using a camera sensor and displaying a screen of a display with a set luminance in an electronic device according to an embodiment.

FIG. 9 is a flowchart 900 illustrating an example method by which the electronic device 101 acquires external illuminance using the camera sensor 330 and displays a display screen with a screen luminance of a defined value according to an embodiment.

According to an embodiment, a processor (e.g., the processor 120 of FIG. 1) may receive an event for turning on a display (e.g., the display 320 of FIG. 3) in operation 910. For example, the electronic device 101 may be turned on by turning on a power supply of the electronic device 101. As another example, the electronic device 101 may be in a state in which an event of turning on the display 320 of the electronic device 101 may have been received through reception of an input of a user or information from the outside. However, it will be understood that the disclosure is not limited thereto.

According to an embodiment, in operation 915, the processor 120 may start turning on the display 320. For example, the display 320 may start an operation at the minimum brightness. The display 320 may wait in a state of being able to receive an external illuminance from the camera module 180.

According to an embodiment, the processor 120 may perform a camera on sequence for acquiring an external illuminance in operation 920. The processor 120 may allow a camera sensor (e.g., the camera sensor 330 of FIG. 3) to be turned on by turning on a camera module (e.g., the camera module 180 of FIG. 1).

According to an embodiment, the processor 120 may maintain a camera operation for a predetermined time in operation 930. The camera sensor 330 may be turned on and may enter the acquisition interval after passing through an enable interval. The processor 120 may be configured such that the camera sensor 330 maintains an acquisition interval for a certain time. The camera sensor 330 may acquire an exposure time and a brightness value from the preview image information in the acquisition interval. The acquisition interval may be the same time as at least one frame. For example, when there are 30 frames in one second, the processor 120 may set the camera sensor 330 to maintain the acquisition interval for about 0.04 seconds, substantially about ⅓₀ seconds, considering a time within an error range.

According to an embodiment, in operation 940, the processor 120 may perform an off sequence in which the camera module 180 stops a camera operation and switches to a standby state. The camera sensor 330 may return to the standby state or be turned off after the acquisition interval. The camera sensor 330 may reduce a current consumed by the camera module 180 by maintaining the standby state or the turned-off state except for the acquisition interval. After the acquisition interval in which both the camera module 180 and the camera sensor 330 are turned on, the camera sensor 330 may be turned off in the release interval and the camera module 180 may consume only a small amount of current (e.g., the third current I3) to perform a release operation for switching the camera sensor 330 to a standby state during a certain interval after the camera sensor 330 is turned off.

According to an embodiment, in operation 950, the processor 120 may acquire an external illuminance by analyzing stored values. For example, the stored values may be the exposure time and the brightness value. The processor 120 may calculate the external illuminance by selectively analyzing the exposure time and the brightness value.

According to an embodiment, the electronic device 101 may increase a luminance of a screen based on the acquired external illuminance in operation 960. For example, after the display 320 is turned on in operation 915, the display 320 may start an operation at the minimum brightness level. The luminance value of a screen displayed by the display 320 may be defined according to the external illuminance value. The luminance of the screen displayed on the display 320 may gradually increase until a defined luminance value is reached. For example, the processor 120 may gradually increase the luminance of the screen such that a screen displayed by the display 320 reaches the brightness of the screen defined by the external illuminance value from initially the minimum perceived brightness with which the user is able to identify a turned-on state.

As another example, the display 320 may start with a default value after starting to be turned on in operation 915. The default value is not limited to the minimum perceived brightness or the minimum luminance, and may be a specified luminance value or a luminance value with which is set immediately before the display 320 is operated and turned off. In this case, it is possible to increase or decrease the luminance of the display 320 to change the luminance value of the display 320 to the brightness of the screen defined by the external illuminance value. As another example, it is possible to determine the brightness of the display 320 and turn on the display 320 with a defined luminance value after operation 950 of measuring and/or acquiring the external illuminance is performed. In this case, operation 915 may be performed after performing operations 950 and 960.

According to an embodiment, in operation 970, the electronic device 101 may display a screen of the display with a screen luminance having a defined value. When the luminance of the screen displayed on the display 320 reaches the brightness of the screen defined by the set external illuminance value, the processor 120 may determine that the luminance control of the screen is completed. The processor 120 may repeatedly perform operations 920 to 950 at a specified period while the display 320 is kept in the turned-on state. The processor 120 may additionally adjust the luminance of the display 320 based on the external illuminance newly acquired by performing operations 920 to 950.

Figure 10:
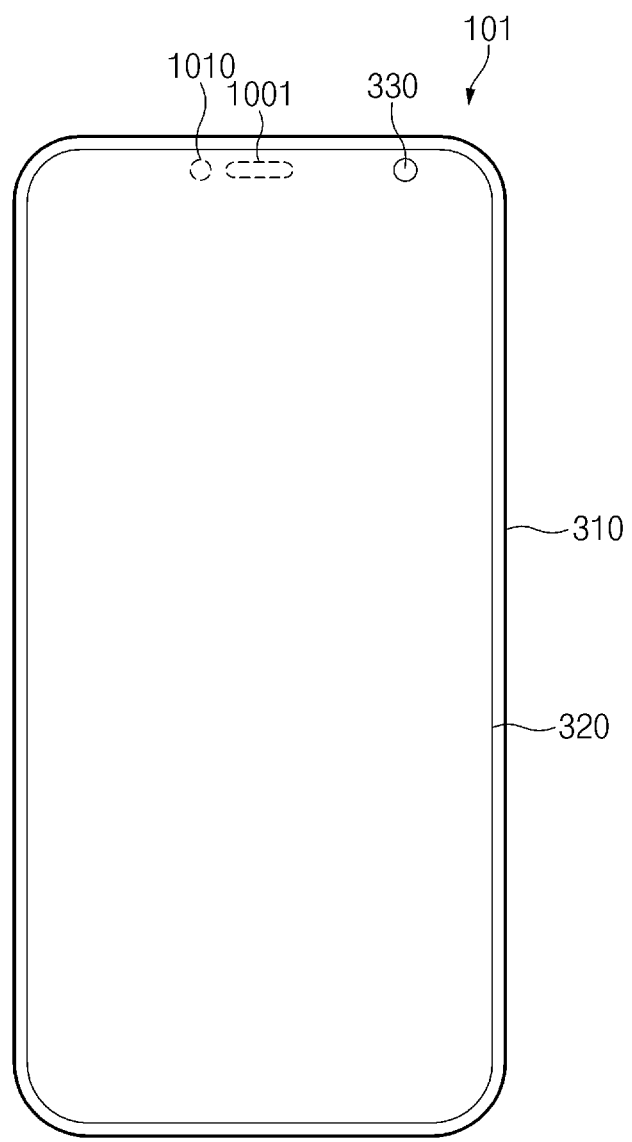
FIG. 10 is a diagram illustrating an example electronic device including a housing, a display, a camera sensor, a speaker, and an illuminance sensor according to an embodiment.

FIG. 10 is a diagram illustrating an example electronic device 101 including a housing 310, a display 320 (e.g., the display device 160 of FIG. 1), a camera sensor 330 (e.g., the image sensor 230 of FIG. 2), a speaker 1001 (e.g. the sound output device 155 of FIG. 1), and an illuminance sensor 1010 (e.g. the sensor module 176 of FIG. 1) according to an embodiment. The housing 310, the display 320, and the camera sensor 330 according to an embodiment of FIG. 10 is substantially identical or similar to the housing 310, the display 320, and the camera sensor 330 according to an embodiment of FIG. 3A and FIG. 3B, and thus a repeated description of these elements may not be repeated here.

In an example embodiment, the speaker 1001 may be disposed at the front side of the electronic device 101. For example, the speaker 1001 may be disposed at the upper central part of the front side of the electronic device 101. The speaker 1001 may output sound. For example, the speaker 1001 may output voice of the speaker when the electronic device 101 receives incoming call. As another example, the speaker 1001 may output sound generated by the electronic device 101 when an application (e.g., the application 146 of FIG. 1) is executed and/or operated. However, it will be understood that the disclosure is not limited thereto.

In an example embodiment, the illuminance sensor 1010 may measure an external illuminance. The illuminance sensor 1010 may transmit the measured external illuminance to the processor (e.g. the processor 120 of FIG. 1). The illuminance sensor 1010 may be disposed under the display 320. The illuminance sensor 1010 may be disposed toward to front side of the electronic device 101. The illuminance sensor 1010 may be disposed adjacent to the speaker 1001 of the electronic device 101. For example, the illuminance sensor 1010 may be disposed adjacent to a left side the speaker 1001 and/or a right side the speaker 1001. In this case, when a user of the electronic device 101 places ears near the speaker 1001, the illuminance sensor 1010 may detect that the external illuminance is changed below specified external illuminance. The illuminance sensor 1010 may transmit the changed external illuminance to the processor 120. The processor 120 may turn-off the display based on the changed external illuminance. However, the disclosure is not limited to this scenario, and the illuminance sensor 1010 may be disposed at the lower central part of the front side of the electronic device 101 and/or may be disposed at any region in the display 320. As another example, the illuminance sensor 1010 may be disposed as separate module at the outside of the display 320 and/or the back side of the electronic device 101.

Figure 11:
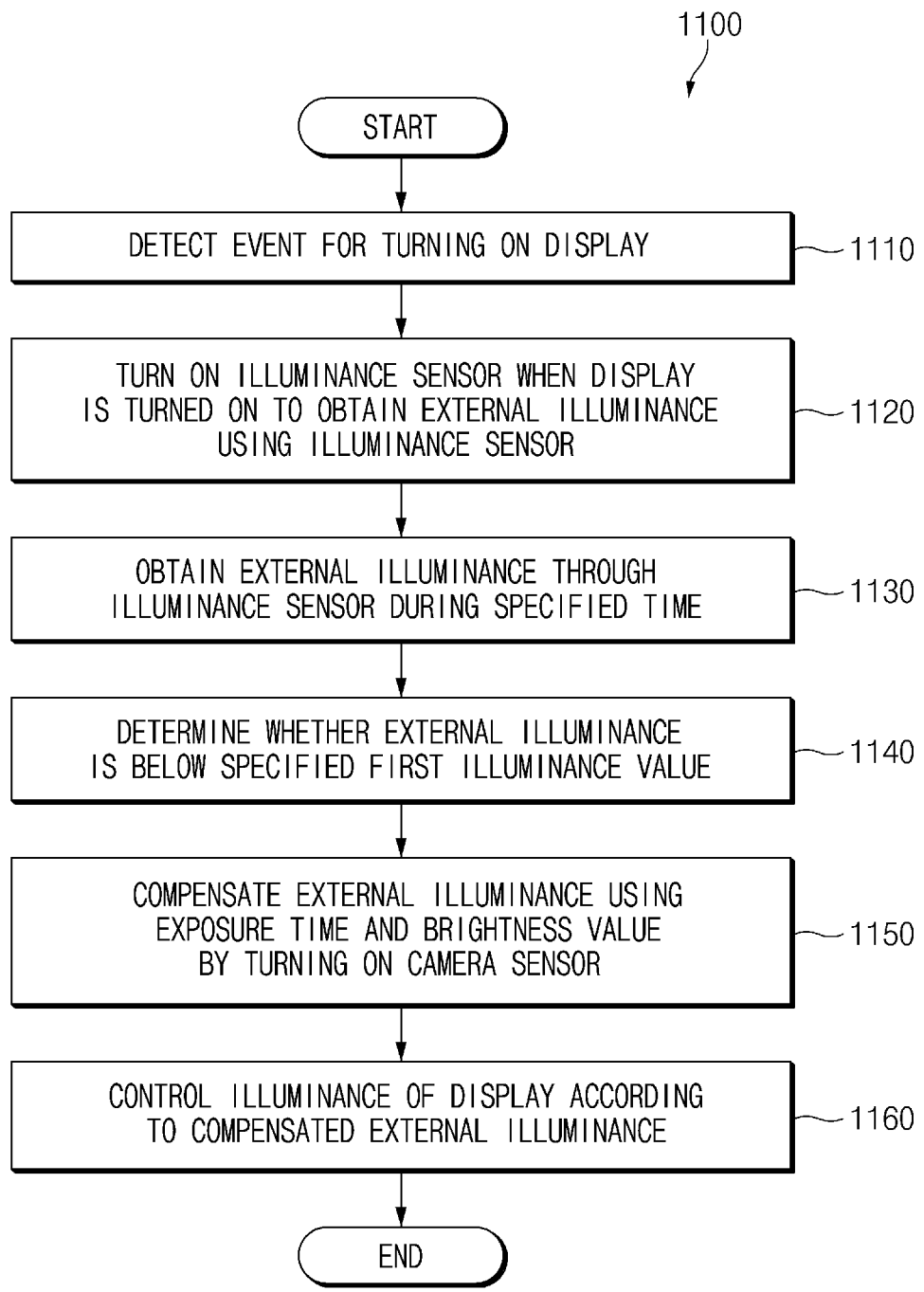
FIG. 11 is a flowchart illustrating an example method of acquiring an external illuminance using an illuminance sensor and controlling a brightness of a display with a compensated external luminance using a camera sensor in an electronic device according to an embodiment.

FIG. 11 is a flowchart illustrating an example method of acquiring an external illuminance using an illuminance sensor (e.g., the illuminance sensor 1010 of FIG. 10) and controlling a brightness of a display (e.g., the display 320 of FIG. 10) with an compensated external luminance using a camera sensor (e.g., the camera sensor 330 of FIG. 10) in an electronic device (e.g., the electronic device 101 of FIG. 10) according to an embodiment.

According to an embodiment, the processor (e.g., the processor 120) of FIG. 1) of the electronic device 101 may detect the turn-on event of the display 320 in operation 1110. The turn-on event of the display 320 may include, for example, and without limitation, a power-on, a key input during standby, an event reception through a communication module (e.g., the communication module 190 of FIG. 1), or a periodic notification. For example, when the electronic device 101 is turned on, the display 320 may be turned on to display a booting screen of the electronic device 101. As another example, when a key input or a touch input is received by the electronic device 101 in a state in which the electronic device 101 is turned on but the display 320 is turned off (e.g., in a standby state), a wake-up in which the display 320 is turned on may be performed. The wake-up may be performed when the electronic device 101 receives an input from a user through the display 320 or an input device of the electronic device 101 (e.g., the input device 150 of FIG. 1), when information and/or an event is acquired from the outside through the communication module 190 of the electronic device 101, or when a proximity of the electronic device 101 to another object is changed or an angle the electronic device 101 to the ground is changed. As another example, the turn-on event of the display 320 may occur to notify schedules stored in the memory of the electronic device 101 (e.g., the memory 130 of FIG. 1) or schedules stored in an application (e.g., the application 146 of FIG. 1).

According to an embodiment, the processor 120 may turn on the illuminance sensor 1010 to obtain the external illuminance using the illuminance sensor 1010 when the display 320 is turned on in operation 1120. When using the illuminance sensor 1010, the processor 120 cannot identify ambient brightness if the illuminance sensor 1010 is turned off, is in the sleep state, or is in the inactive state. The processor 120 may be configured to turn on the illuminance sensor 1010 to identify the ambient brightness when the display 320 is turned on.

In an example embodiment, the processor 120 may turn on the illuminance sensor 1010 by turning on a sensor module (e.g., the sensor module 176 of FIG. 1). For example, the processor 120 may turn on the sensor module 176 and measure the external illuminance through the illuminance sensor 1010. As another example, the processor 120 may selectively turn on and/or turn off only the illuminance sensor 1010.

According to an embodiment, the processor 120 may measure the external illuminance for a specified time using the illuminance sensor 1010 in operation 1130. For example, the processor 120 may turn on the illuminance sensor 1010 for a specified time and obtain the exposure time of the illuminance sensor 1010 at the acquisition interval after the enable interval and the brightness value of the external environment. For example, the processor 120 may obtain the external illuminance for a specified time using the illuminance sensor 1010 to identify the change of the external illuminance. The illuminance sensor 1010 may transmit the external illuminance to the processor 120 without saving the external illuminance at a memory (e.g., the memory 130 of FIG. 1).

In an example embodiment, the enable interval may be an interval for preparation to acquire the external illuminance after the illuminance sensor 1010 is turned on.

In an example embodiment, the acquisition interval may be an interval for which the illuminance sensor 1010 is able to acquire information related to the external illuminance from the image after the illuminance sensor 1010 is turned on. The camera sensor 101 may acquire and analyze the exposure time and the external brightness value for the time set as the acquisition interval.

In an example embodiment, the exposure time may be a time for which the illuminance sensor 1010 is exposed to external light. The brightness value may be a value related to ambient brightness information acquired by the illuminance sensor 1010 and calculated according to an internal algorithm.

In an example embodiment, the processor 120 may measure the external illuminance when the display 320 is turned on. The processor 120 may obtain the exposure time and/or the external brightness value when the display 320 is turned on.

According to an embodiment, the processor 120 may determine whether the external illuminance is below the specified first illuminance value in operation 1140. The first illuminance value is the threshold value the illuminance sensor 1010 determines as low illuminance environment. The first illuminance value may, for example, be the external illuminance value at the dark environment like night, twilight, and/or evening. The first illuminance value may, for example, be the external illuminance value at the dark inside space. For example, the first illuminance value may be about 100 lux, but the disclosure is not limited thereto. When the external illuminance is below the first illuminance value the external illuminance measured in the illuminance sensor 1010 is affected by the brightness of the screen of the display 320. The processor 120 may proceed to operation 1150 to compensate the external illuminance to a more accurate value when the external illuminance measured in the illuminance sensor 1010 is below the first illuminance value.

In an example embodiment, the processor 120 may maintain the camera sensor 330 in a turn off state when the external illuminance exceeds the first illuminance value. When the external illuminance exceeds the first illuminance value, the external illuminance measured at the illuminance sensor 1010 may have reliability higher than the specified reliability. When the external illuminance exceeds the first illuminance value, by turning off the camera sensor 330, the consumption power of the camera sensor 330 may be decreased.

According to an embodiment, in operation 1150, the processor 120 may compensate an external illuminance by turning on the camera sensor 330 and processing an exposure time and a brightness value. In an environment where the external illuminance is below the first illuminance value, the external illuminance measured by the illuminance sensor may be affected by the brightness of the screen of the display 320. The processor 120 may turn on the camera sensor 330 and obtain the exposure time and the brightness value at the acquisition interval after the enable interval. The camera sensor 330 can transmit the exposure time and the brightness value to the processor 120. The enable interval may be an interval for preparation to acquire the preview image information is performed after the camera sensor 330 is turned on. The acquisition interval may be an interval for which the camera sensor 330 is able to acquire information related to the external illuminance from the image after the camera sensor 330 is turned on. The camera sensor 330 may obtain and analyze the exposure time and the brightness value through the preview image information during period determined as the acquisition interval. The processor 120 may compensate the external illuminance to a more accurate value using the camera sensor 330.

According to an embodiment, the processor 120 may control a luminance of the display 320 according to the compensated external illuminance in operation 1160. The processor 120 may decrease the luminance of a screen to minimize and/or reduce the glare of a user due to the brightness of a screen of the display 320 in low illuminance environment. The processor 120 may increase a luminance of the screen such that the user may recognize contents displayed on the display 320 in high illuminance environment. For example, the processor 120 may change the luminance of the screen to be proportional to the measured external illuminance.

According to various example embodiments, the electronic device may include the housing, the display viewable via a front surface of the housing to display a screen, the camera sensor disposed in at least a portion of the front surface of the housing configured to measure an external illuminance of a space where the front surface of the housing faces, the processor operationally connected to the display and the camera sensor, and the memory operationally connected to the processor, and the memory is configured to store instructions that, when executed, cause the processor to control the electronic device to: detect an turn-on event of the display, turn on the camera sensor to acquire the external illuminance using the camera sensor based on the display being turned on, acquire preview image information for a specified time through the camera sensor, turn off the camera sensor, acquire the external illuminance using an exposure time and a brightness value, and control a luminance of the display based on the external illuminance.

In an example embodiment, the instructions cause the processor to control the electronic device to acquire the exposure time and the brightness value from the preview image information at each specified period when the display has been turned on.

For example, the specified time may be substantially equal to any one frame included in the specified period.

In an example embodiment, the instructions cause the processor to control the electronic device to acquire the external illuminance using the exposure time based on luminance of the preview image information being lower than or equal to a first luminance, acquire the external illuminance using the brightness value based on the luminance of the preview image information exceeding the first luminance, and acquire the external illuminance using the exposure time and the brightness value based on the luminance of the preview image information being lower than or equal to a second luminance, the second luminance being lower than the first luminance.

In an example embodiment, the electronic device may further include a communication circuit (e.g., the communication module 190 of FIG. 1), and the instructions cause the processor to control the electronic device to change the specified period based on the surrounding environment (e.g., current time information).

In an example embodiment, the instructions cause the processor to control the electronic device to change the specified period based on whether the electronic device moves or rotates or changes a position at which the electronic device is located.

In an example embodiment, the instructions cause the processor to control the electronic device to increase the specified period based on the measured external illuminance being the same a predetermined number of times or more and based on a position of the electronic device being fixed.

In an example embodiment, the instructions cause the processor to control the electronic device to apply a first gain value to the exposure time and the brightness value acquired in an edge region of the preview image information acquired by the camera sensor, and apply a second gain value to the exposure time and the brightness value acquired in a center region (e.g., the center region 730 of FIG. 7 or the center region 830 of FIG. 7) of the preview image information, and the second gain value has a value less than the first gain value.

According to various example embodiments, a method of measuring an external illuminance using the camera sensor in the electronic device includes detecting a turn-on event of a display, turning on the camera sensor to acquire the external illuminance using the camera sensor based on the display being turned on, acquiring preview image information for a specified time through the camera sensor, turning off the camera sensor, acquiring the external illuminance using an exposure time and a brightness value based on the acquired preview image information, and controlling a luminance of the display based on the external illuminance.

According to various example embodiments, the electronic device may include a housing, a display viewable via a front surface of the housing to display a screen, a camera including a camera sensor disposed in at least a portion of the front surface of the housing and configured to measure an external illuminance of a space in a direction that the front surface of the housing faces, a processor operationally connected to the display and the camera, and a memory operationally connected to the processor, and the memory is configured to store instructions that, when executed, cause the processor to control the electronic device to: determine whether the display is turned on, turn on the camera sensor at at least one specified period based on a result of determination, acquire an exposure time and a brightness value from preview image information acquired by the camera sensor during an acquisition interval defined based on a number of frames based on the display being turned on, measure the external illuminance using the exposure time and/or the brightness value, and control a luminance of a screen based on the measured external illuminance.

The electronic device according to various example embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various example embodiments of the disclosure, it is possible to reduce the consumption of the battery of the electronic device to measure the external illuminance using the camera sensor by decreasing a time during which the camera sensor is turned on.

According to various example embodiments of the disclosure, it is possible to reduce battery consumption and to deal with a change in the external environment by measuring the external illuminance using a camera sensor for a periodic and short time.

According to various example embodiments of the disclosure, based on the illuminance sensor being disposed under the display measuring the external illuminance and the external illuminance value being influenced by the brightness of the screen of the display, the external illuminance value is compensated to accurately determine the external illuminance using camera sensor.

In addition, various effects may be provided that are directly or indirectly understood through the disclosure.

While the disclosure has been illustrated and described with reference to various example embodiments thereof, it will be understood by those skilled in the art that various changes in form and details may be made therein without departing from the spirit and scope of the disclosure as set forth, for example, in the appended claims and their equivalents.

What is claimed is:

1. An electronic device comprising:
a housing;
a display viewable via a front surface of the housing and configured to display a screen;
a camera sensor disposed in at least a portion of the front surface of the housing and configured to measure an external illuminance;
a processor operationally connected to the display and the camera sensor; and
a memory operationally connected to the processor,
wherein the memory is configured to store instructions that, when executed, cause the processor to control the electronic device to:
detect a turn-on event of the display;
turn on the camera sensor to acquire the external illuminance using the camera sensor at a time point when the display is turned on;
acquire preview image information for a specified time through the camera sensor, wherein the preview image information includes an exposure time and a brightness value;
turn off the camera sensor after acquiring the preview image information for the specified time;
apply a first gain value to the brightness value of an edge region of the preview image information to obtain a first gained brightness value; and
apply a second gain value which has a value less than the first gain value to the brightness value of a center region of the preview image information to obtain a second gained brightness value;
determine the external illuminance using the exposure time, the first gained brightness value, and the second gained brightness value; and
control a luminance of the display based on the external illuminance.

2. The electronic device of claim 1, wherein the instructions cause the processor to control the electronic device to acquire the exposure time and the brightness value from the preview image information at each of at least one specified period based on the display being turned on.

3. The electronic device of claim 2, wherein the specified time is substantially equal to any one frame included in the specified period.

4. The electronic device of claim 2, further comprising:
a communication circuit,
wherein the instructions cause the processor to control the electronic device to:
acquire current time information using the communication circuit; and
change the specified period based on the acquired current time information.

5. The electronic device of claim 2, wherein the instructions cause the processor to control the electronic device to change the specified period based on whether the electronic device moves or rotates or changes a position at which the electronic device is located.

6. The electronic device of claim 2, wherein the instructions cause the processor to control the electronic device to increase the specified period based on the measured external illuminance being the same a predetermined number of times or more and based on a position of the electronic device being fixed.

7. An electronic device comprising:
a housing;
a display viewable via a front surface of the housing and configured to display a screen;
a camera sensor disposed in at least a portion of the front surface of the housing and configured to measure an external illuminance;
a processor operationally connected to the display and the camera sensor; and
a memory operationally connected to the processor,
wherein the memory is configured to store instructions that, when executed, cause the processor to control the electronic device to:
detect a turn-on event of the display;
turn on the camera sensor to acquire the external illuminance using the camera sensor at a time point when the display is turned on;
acquire preview image information for a specified time through the camera sensor, wherein the preview image information includes an exposure time and a brightness value;
turn off the camera sensor after acquiring the preview image information for the specified time;
acquire the external illuminance using the exposure time and the brightness value; and
control a luminance of the display based on the external illuminance,
wherein the acquire the external illuminance comprises:

acquire the external illuminance using the exposure time based on luminance of the preview image information being less than or equal to a first luminance;

acquire the external illuminance using the brightness value based on the luminance of the preview image information exceeding the first luminance; and acquire the external illuminance using the exposure time and the brightness value based on the luminance of the preview image information being less than or equal to a second luminance, the second luminance being less than the first luminance.

8. A method of measuring an external illuminance using a camera sensor of an electronic device, the method comprising:

detecting a turn-on event of a display;

turning on the camera sensor to acquire the external illuminance using the camera sensor at a time point when the display is turned on;

acquiring preview image information for a specified time through the camera sensor;

turning off the camera sensor after acquiring the preview image information for the specified time;

applying a first gain value to the brightness value acquired in an edge region of the preview image information acquired by the camera sensor to obtain a first gained brightness value;

applying a second gain value which has a value less than the first gain value to the brightness value acquired in a center region of the preview image information to obtain a second gained brightness value; and determining the external illuminance using the exposure time, the first gained brightness value, and the second gained brightness value; and controlling a luminance of the display based on the external illuminance.

9. The method of claim 8, wherein the acquiring of the external illuminance using the exposure time and the brightness value includes acquiring the exposure time and the brightness value from the preview image information at each of at least one specified period based on the display being turned on.

10. The method of claim 9, wherein the specified time is substantially equal to any one frame included in the specified period.

11. The method of claim 9, further comprising:
acquiring current time information at a location associated with the electronic device; and
changing the specified period based on the acquired current time information.

12. The method of claim 9, further comprising:
changing the specified period based on whether the electronic device moves or rotates or changes a position at which the electronic device is located.

13. The method of claim 9, further comprising:
increasing the specified period based on the measured external illuminance being the same a predetermined number of times or more and based on a position of the electronic device being fixed.

14. A method of measuring an external illuminance using a camera sensor of an electronic device, the method comprising:

detecting a turn-on event of a display;

turning on the camera sensor to acquire the external illuminance using the camera sensor at a time point when the display is turned on;

acquiring preview image information for a specified time through the camera sensor;

turning off the camera sensor after acquiring the preview image information for the specified time;

acquiring the external illuminance using an exposure time and a brightness value included in the acquired preview image information; and controlling a luminance of the display based on the external illuminance, wherein acquiring the external illuminance comprises:
acquiring the external illuminance using the exposure time based on luminance of the preview image information being less than or equal to a first luminance;

acquiring the external illuminance using the brightness value based on the luminance of the preview image information exceeding the first luminance; and acquiring the external illuminance using the exposure time and the brightness value based on the luminance of the preview image information being less than or equal to a second luminance, the second luminance being less than the first luminance.

15. An electronic device comprising:
a housing;
a display viewable via a front surface of the housing and configured to display a screen;
a camera including a camera sensor disposed in at least a portion of the front surface of the housing and configured to measure an external illuminance of a space in a direction that the front surface of the housing faces;
an illuminance sensor disposed under the display and configured to measure the external illuminance;
a processor operationally connected to the display, the camera, and the illuminance sensor; and
a memory operationally connected to the processor, wherein the memory is configured to store instructions that, when executed, cause the processor to control the electronic device to:

detect a turn-on event of the display, turn on the illuminance sensor based on the display being turned on, obtain the external illuminance through the illuminance sensor during a specified period, determine whether the external illuminance is less than a specified first illuminance value, turn-on the camera sensor based on the external illuminance being less than the first illuminance value, acquire an exposure time and a brightness value from preview image information acquired by the camera sensor, compensate the external illuminance using the exposure time and/or the brightness value, and control a luminance of the display based on the compensated external illuminance.

16. The electronic device of claim 15, wherein the instructions cause the processor to control the electronic device to:
allow the camera sensor to be turned on by performing a camera-on sequence for the camera to enter an acquisition interval after passing through an enable interval, to acquire the external illuminance; and
perform an operation of maintaining an operation of the camera for a predetermined time.

17. The electronic device of claim 16, wherein the instructions cause the processor to control the electronic device to turn on the display and increase a luminance of the display from a minimum brightness based on the acquired external illuminance.

18. The electronic device of claim 15, wherein the instructions cause the processor to control the electronic device to periodically turn on the camera sensor at the specified period to acquire the external illuminance.

19. The electronic device of claim 15, wherein the instructions cause the processor to control the electronic device to:
- apply a first gain value to the exposure time and the brightness value acquired in an edge region of the preview image information acquired by the camera sensor; and
- apply a second gain value to the exposure time and the brightness value acquired in a center region of the preview image information,
- wherein the second gain value has a value less than the first gain value.

* * * * *